US008626907B2

(12) United States Patent
Sugaya (10) Patent No.: US 8,626,907 B2
(45) Date of Patent: Jan. 7, 2014

(54) INFORMATION PROCESSING UNIT, PROGRAM EXECUTION METHOD, AND PROGRAM FOR CONTROLLING ELECTRIC APPLIANCE

(75) Inventor: Shunji Sugaya, Tokyo (JP)

(73) Assignee: OPTiM Corporation, Saga (JP)

( * ) Notice: Subject to any disclaimer, the term of this patent is extended or adjusted under 35 U.S.C. 154(b) by 0 days.

(21) Appl. No.: 13/385,866

(22) Filed: Mar. 9, 2012

(65) Prior Publication Data
US 2013/0191529 A1 Jul. 25, 2013

(30) Foreign Application Priority Data

Jan. 25, 2012 (JP) ................................. 2012-013057

(51) Int. Cl.
*G06F 15/16* (2006.01)
(52) U.S. Cl.
USPC .......................................... 709/224; 709/227
(58) Field of Classification Search
None
See application file for complete search history.

(56) References Cited

U.S. PATENT DOCUMENTS

| 2005/0197989 | A1* | 9/2005 | Hori et al. .................... 706/47 |
| 2005/0286722 | A1* | 12/2005 | Aboba et al. .................. 380/277 |
| 2006/0259184 | A1* | 11/2006 | Hayes et al. .................. 700/221 |
| 2010/0318699 | A1* | 12/2010 | Gao-Saari et al. ............. 710/72 |
| 2012/0290694 | A9* | 11/2012 | Marl et al. .................... 709/223 |

FOREIGN PATENT DOCUMENTS

| JP | 2005-109746 | 4/2005 |
| JP | 2010097587 A | 4/2010 |

* cited by examiner

*Primary Examiner* — Ario Etienne
*Assistant Examiner* — Clayton R Williams
(74) *Attorney, Agent, or Firm* — BainwoodHuang (57) ABSTRACT

An information processing unit, a program execution method, and a program are capable of identifying the type of an electric appliance and then automatically performing the setting operation, the setting information viewing, and the like of the electric appliance in order to enhance the user convenience. The information processing unit detects the electric appliance connected with a network and then determines the model related information of the detected electric appliance. The information processing unit selects a program corresponding to the model related information based on the determined model related information and then executes the selected program in a device communicatively connected with the electric appliance.

6 Claims, 7 Drawing Sheets

<SCHEDULE EXECUTION PROGRAM CORRESPONDENCE TABLE>

| MODEL RELATED INFORMATION | SCHEDULE EXECUTION PROGRAM | TARGET DEVICE TO EXECUTE PROGRAM |
|---|---|---|
| A-01 | PROGRAM A (FILTERING CONFIGURATION) | DETECTED DEVICE |
| : | : | : |
| B003 | PROGRAM B (PAGE GENERATION) | DETECTION EXECUTION DEVICE |
| : | : | : |
| PS-01 | ACCESS TO REFERENCE SERVER http://www.XXXXX/ | DETECTED DEVICE |
| : | : | : |
| DE004 | REFERENCE INPUT HISTORY OF WINDOW A | DETECTED DEVICE |
| : | : | : |

Fig.6

<REFERENCE DATA WEB PAGE>

```
                60                          61
              ┌─────────────────────────────────┐
              │ http://www.XXXXX                │

PS-01     Update module    Status

Name       Updated date    Countermeasure
   63         fix011     2012.3.4        Module modification
              fix012     2012.1.19       Error correction
```

Fig.7

<REFERENCE DATA CORRESPONDENCE PROGRAM TABLE>

| REFERENCE DATA | SCHEDULE EXECUTION PROGRAM | TARGET DEVICE TO EXECUTE PROGRAM |
|---|---|---|
| fix011 | PROGRAM C | DETECTED DEVICE |
| : | : | : |
| fix012 | PROGRAM D | DETECTED DEVICE |
| : | : | : |

INFORMATION PROCESSING UNIT, PROGRAM EXECUTION METHOD, AND PROGRAM FOR CONTROLLING ELECTRIC APPLIANCE

CROSS REFERENCE TO RELATED APPLICATIONS

This application is based on and claims the benefit of priority from Japanese Patent Application No. 2012-013057, filed on Jan. 25, 2012, the content and teachings of which are incorporated herein by reference.

TECHNICAL FIELD

The present disclosure relates to an information processing unit, a program execution method, and a program for controlling an electric appliance connected with a network.

BACKGROUND ART

Recently, a method and a device has been known in which the device such as a router or a gateway automatically identifies the type of an electric appliance connected with a home or office network For example, PLT 1 discloses that an information processing unit transmits and receives network protocols to and from an electric appliance, and then conducts scoring based on response packets specific to the electric appliance to identify the type of the electric appliance.

CITATION LIST

Patent Literature
PLT 1: Japanese Unexamined Patent Application 2010-097587

SUMMARY OF INVENTION

However, this information processing unit is preoccupied with identifying the type of an electric appliance. Accordingly, the subsequent action has to be done by a person such as an administrator who runs the network. After the type of the electric appliance is identified, a setting operation for this electric appliance is often required to be performed, or software related to this electric appliance to be executed.

At present, the wide variety and numbers of electric appliances are connected with a network and generally have different ways of the setting operation and the setting information viewing. Therefore, some users who use such electric appliances may often take time in the setting operation and the setting information viewing and may not always know these operations or use these electric appliances properly.

An objective of the present disclosure is to provide an information processing unit, a program execution method, and a program capable of identifying the type of an electric appliance and then automatically performing the setting operation, the setting information viewing, and the like of the electric appliance in order to enhance the user convenience.

According to one embodiment, an information processing unit executing a predetermined process in response to connecting an electric appliance with a network includes:
a detection module configured to detect the electric appliance connected with a network;
a model related information determination module configured to determine the model related information of the detected electric appliance; and
a program execution module configured to select a program corresponding to the model related information based on the determined model related information and to execute the selected program in a device communicatively connected with the electric appliance.

According to one embodiment, an information processing unit executing a predetermined process in response to connecting an electric appliance with a network detects the electric appliance connected with a network, determines the model related information of the detected electric appliance, selects a program corresponding to the model related information based on the determined model related information, and executes the selected program in a device communicatively connected with the electric appliance.

Accordingly, these embodiments can identify the type of an electric appliance and then perform the setting operation, the setting information viewing, and the like of the electric appliance by executing a predetermined program.

According to one embodiment, in the information processing unit, the program execution module executes a program to generate one URL address corresponding to the electric appliance and a page corresponding to the URL address, the page describing the model related information of the electric appliance, and to allow the page to be viewed from other devices.

Accordingly, this embodiment can identify the type of an electric appliance and then perform the setting operation, the setting information viewing, and the like of the electric appliance.

According to one embodiment, in the information processing unit,
the program execution module selects a corresponding program based on the model related information as well as input history for the electric appliance or web page information referenced from the electric appliance.

Accordingly, this embodiment can identify the type of an electric appliance and then execute an appropriate program based on the input history and the referenced information.

Embodiments of the present invention can provide an information processing unit, a program execution method, and a program capable of identifying the type of an electric appliance and then automatically performing the setting operation, the setting information viewing, and the like of the electric appliance in order to enhance the user convenience.

DESCRIPTION OF EMBODIMENTS

Hereinafter, embodiments of the present invention will be described with reference to the attached drawings. However, this is illustrative only, and the technological scope of the present invention is not limited thereto.

System Configuration of Program Execution System

Figure 1:
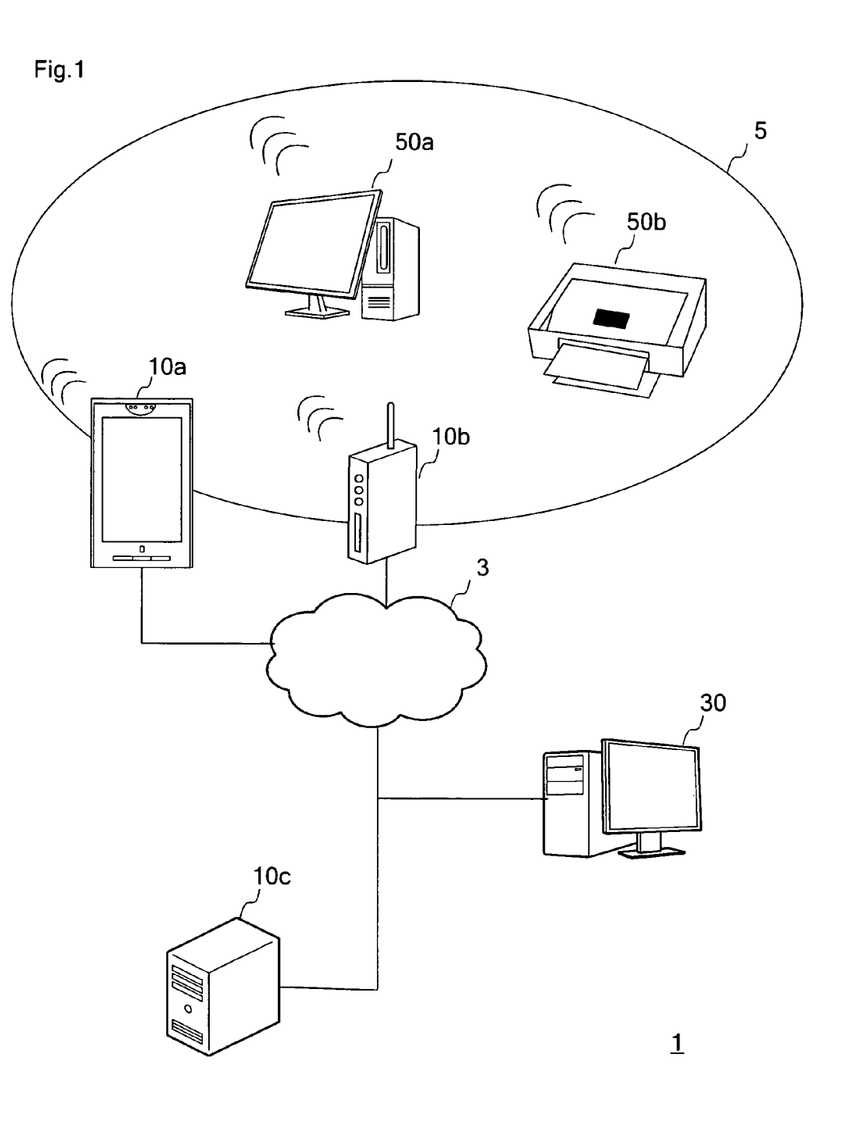
FIG. 1 shows an overall schematic diagram of an example program execution system.

FIG. 1 shows a system configuration diagram of the program execution system 1. The program execution system 1 includes information processing units 10a, 10b, and 10c (hereinafter referred to as "10" unless they are clearly specified), electric appliances 50a and 50b (hereinafter referred to as "50" unless they are clearly specified), a public network 3 (e.g. the Internet, a third and a fourth generation communication networks), and an access terminal 30.

The information processing unit 10 is communicatively connected with the electric appliance 50 and the access terminal 30 through a public network 3 or a local area network 5. The communication in the program execution system 1 may be wireless or wired communication. The information processing unit 10 may be communicatively connected with a public network 3 through a network device such as a router.

The information processing unit 10 may be a device performing a general computer processing, such as a server 10c, a mobile phone, or a smart phone 10a. The information processing unit 10 may also be a network device 10b such as a router or a gateway. The information processing unit 10 may also be a complex printer or a television, a home electric appliance such as a refrigerator or a washing machine. The information processing unit 10 may also be a general information appliance such as a telephone, a netbook terminal, a slate terminal, an electronic book terminal, an electronic dictionary terminal, a portable music player, or a portable player capable of recording and playing back contents.

The electric appliance 50 is a home or office electric appliance capable of data communication. The electric appliance 50 includes information appliances such as a personal computer 50a, a television, a telephone, a computer, a mobile phone, a handheld terminal, a net book terminal, a slate terminal, an electronic book terminal, a portable music player, an audio component, a content player, a printer 50b, a facsimile machine, a copy machine, a scanner machine, and a multi-function peripheral device or a multi-function printer (hereinafter referred to as "MFP"). The electric appliance 50 also includes home electric appliances such as a refrigerator, a washing machine, a dishwasher, a fan, an air conditioner, an electric stove, a rice cooker, and a microwave oven. The electric appliance 50 also includes a light, a server, a router 10b, a gateway, and a network attached storage (hereinafter referred to as "NAS").

The access terminal 30 is a general information terminal used by an administrator who supports the electric appliance 50.

Functions

Figure 2:
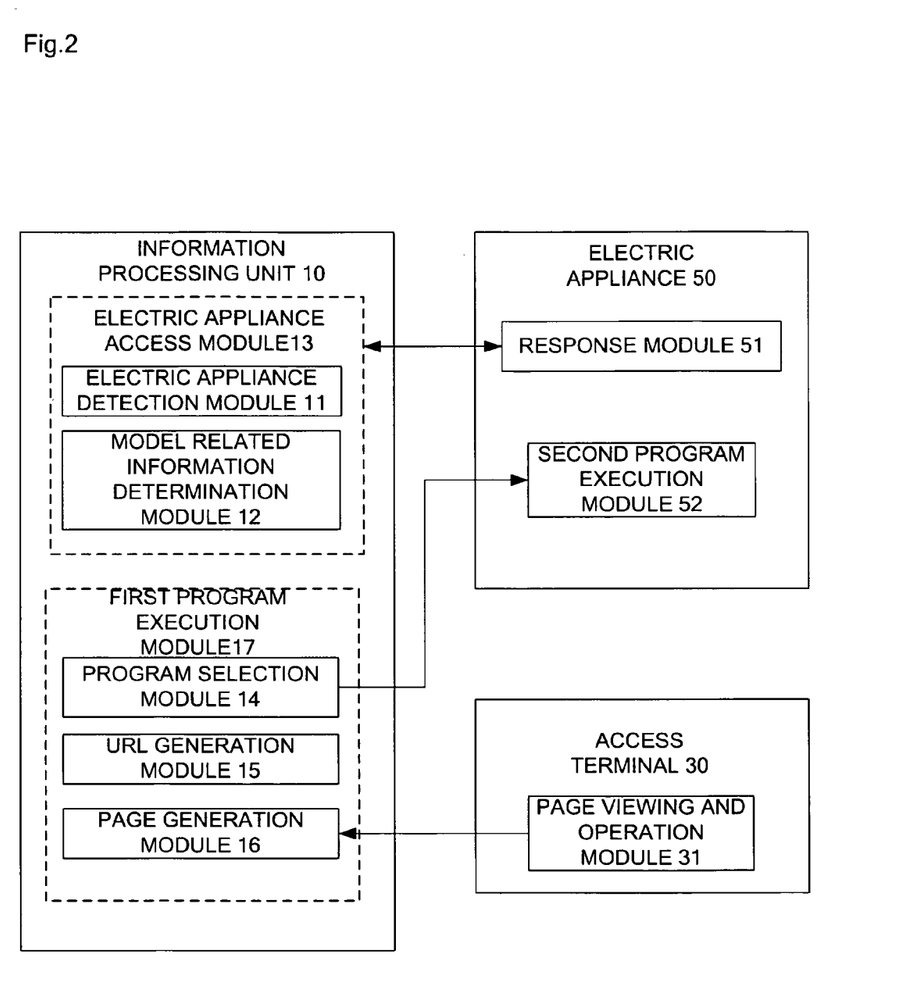
FIG. 2 shows a functional block diagram of an example information processing unit, an example electric appliance, and an example access terminal.

FIG. 2 is a functional block diagram of the information processing unit 10, the electric appliance 50, and the access terminal 30, illustrating the relationship between individual functions.

The information processing unit 10 and the access unit 30 include a control unit provided with a central processing unit (hereinafter referred to as "CPU"), random access memory (hereinafter referred to as "RAM"), and read only memory (hereinafter referred to as "ROM"). The information processing unit 10 and the access unit 30 also include a communication unit such as Wireless Fidelity® or WiFi® enabled device complying with, for example, IEEE 802.11, or a wireless device complying with the IMT-2000 standard such as a third or fourth generation mobile communication system. The communication unit may be achieved through fixed LAN connection.

Furthermore, the information processing unit 10 and the access unit 30 also include an output unit, such as a display unit, to output and display data and images that are controlled by the control unit. The information processing unit 10 and the access unit 30 also include an input unit, such as a touch panel, a keyboard, or a mouse, to receive input from a user and an operator. The information processing unit 10 and the access unit 30 also include a memory unit such as a hard disk or semiconductor memory to store data.

Figure 5:
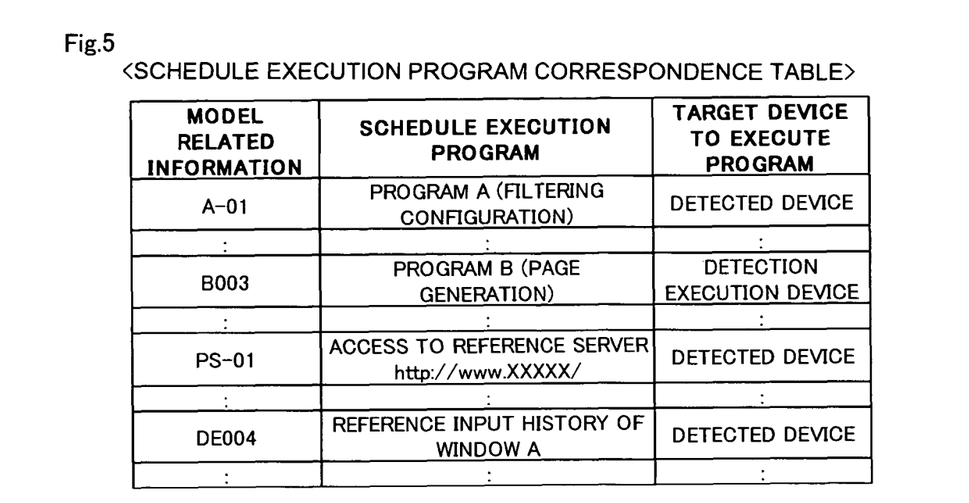
FIG. 5 shows an example schedule execution program correspondence table stored in the information processing unit.
Figure 6:
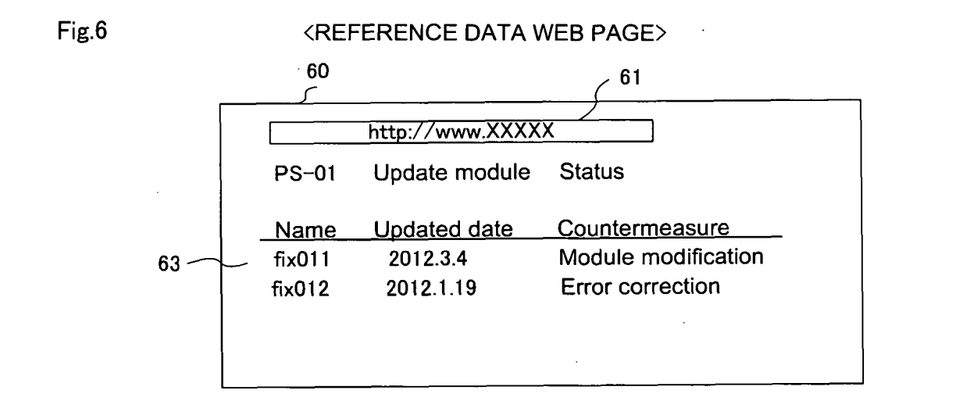
FIG. 6 shows an example reference data web page provided by the reference server.

The information processing unit 10 stores the schedule execution program correspondence table and the reference data correspondence table in the memory unit, as described below in connection with FIGS. 5 and 6, respectively.

In the information processing unit 10, the control unit reads a predetermined program, cooperating with the communication unit, the output unit, the input unit, and the memory unit to achieve an electric appliance access module 13 and a first program execution module 17. The electric appliance access module 13 includes an electric appliance detection module 11 detecting the communicatively connected electric appliance 50 and a model related information determination module 12 determining the detected electric appliance 50. The first program execution module 17 includes a program selection module 14 selecting a program to be executed, a URL generation module 15 generating a unique uniform resource locator (hereinafter referred to as URL), and a page generation module 16 generating a unique page corresponding to the generated URL.

In the access terminal 30, the control unit reads a predetermined program, cooperating with the communication unit, the output unit, the input unit, and the memory unit to achieve a page viewing and operation module 31 such as a web browser.

Like the information processing unit 10 and the access unit 30, the electric appliance 50 includes a control unit provided with a CPU, RAM, and ROM. The electric appliance 50 also include a communication unit such as WiFi® enabled device complying with, for example, IEEE 802.11, or a wireless device complying with the IMT-2000 standard such as a third or fourth generation mobile communication system. The communication unit may be achieved through fixed LAN connection. The electric appliance 50 may also include a memory unit such as a hard disk or semiconductor memory to store data.

Furthermore, the electric appliance 50 may also include an output unit, such as a display unit, to output and display data and images that are controlled by the control unit. The electric appliance 50 also includes an input unit, such as a touch panel, a keyboard, or a mouse, to receive input from a user and an operator.

In the electric appliance 50, the control unit reads a predetermined program, cooperating with the communication unit, the output unit, the input unit, and the data storage unit to achieve a response module 51 responding to a packet transmitted from the information processing unit 10 and a second program execution module 52 executing the selected predetermined program.

Program Execution Process

The program execution process is a process, in which the information processing unit 10 determines the model related information of the electric appliance 50 by transmitting and receiving a predetermined packet and then executes a program based on the model related information and its related information. The model related information is information on the device types, such as the model name and the manufacturer name of the electric appliance 50. In the present process, the process to determine the types of electric appliances connected with a network by transmitting and receiving a packet may be used, as described in Japanese Unexamined Patent Application 2010-97587. The process to determine the model related information in the way disclosed in this patent will be explained below in connection with FIG. 3.

Figure 3:
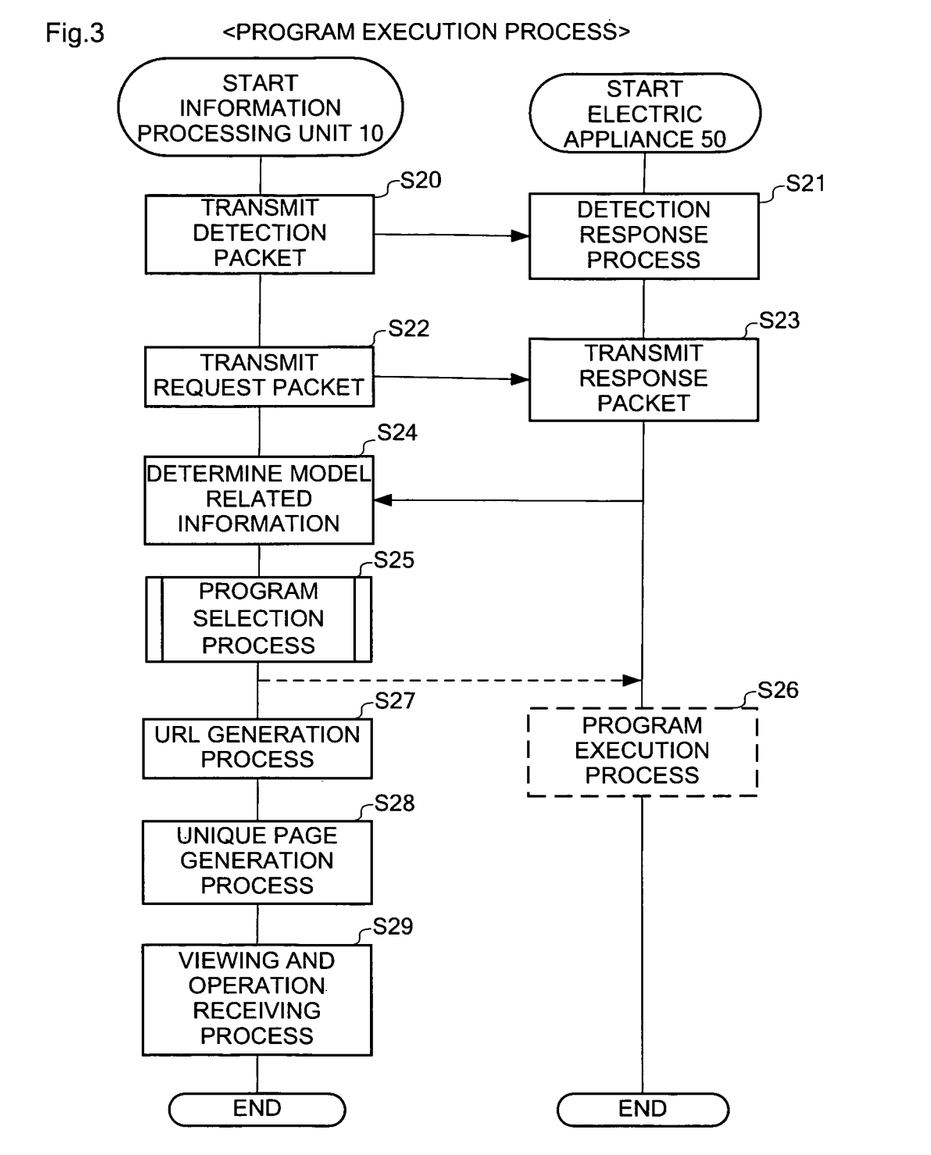
FIG. 3 shows a flow chart illustrating an example program execution process executed by the information processing unit and the electric appliance.

The electric appliance detection module 11 of the information processing unit 10 transmits a detection packet to the electric appliance 50 (Step S20). The detection packet may be a packet transmitted from a command such as ping. Each electric appliance 50 that has received a detection packet executes the detection response process by returning the IP address in response to the received packet (Step S21).

After the electric appliance 50 is detected, the model related information determination module 12 of the information processing unit 10 transmits a request packet to the detected electric appliance 50 (Step S22). The request packet is a packet for the information processing unit 10 to determine the model related information of the electric appliance 50.

For example, the request packet may be a commands such as Address Resolution Protocol (hereinafter referred to as "ARP"), NETSTAT, Internet Control Message Protocol (hereinafter referred to as "ICMP"), or Simple Network Management Protocol (hereinafter referred to as "SNMP"). The request packet may be a protocol complying with Universal Plug and Play (hereinafter referred to as "uPnP") and Digital Living Network Alliance (hereinafter referred to as "DLNA").

The electric appliance 50 transmits a response packet to the received request packet (Step S23). For example, Media Access Control (hereinafter referred to as "MAC") address is acquired as a response in response to an ARP command. Moreover, the port numbers in use and the port occupancy of TCP/IP are identified by the command of NETSTAT.

Based on the response packet, the model related information determination module 12 of the information processing unit 10 determines the model related information of the electric appliance 50 that has transmitted the request packet (Step S24). The model related information is determined by scoring the response packet.

As one example, determination whether the model related information of the electric appliance 50 is the model name A or B will be explained. The scores corresponding to the respective response packets to be received from each of the respective devices with the model names A and B are stored in the respective definition files for these model names. For example, in the case of the model name A, receiving the response packet (the TCP port 5000 is in use) for the request packet (NETSTAT) defines the score as "1,", and receiving other responses for a plurality of respective request packets (response packets for such as ARP as well as NETSTAT) as "0," in the definition file for the model name A. A response packet received from the electric appliance 50 is scored based on each of the respective definition files with the model names A and B. The model name from the definition file with higher score is determined as the model related information.

For example, in the case of the model name A, receiving the response packet (the TCP port 5000 is in use) for the request packet (NETSTAT) defines the score as "1," and receiving other responses as "0." On the other hand, in the case of the model name B, receiving the response packet (the TCP port 5000 is not in use) for the request packet (NETSTAT) defines the score as "1," and receiving other responses as "0."

In this case, when the response packet (the TCP port 5000 is not in use) is received from the electric appliance 50, the score is "0" as calculated based on the definition file for the model name A, and the score is "1" as for the model name B. Therefore, the model name B is the model related information. In this case, the model name B is determined based on only the request packet NETSTAT. However, other request packets (e.g., ARP) are also scored in the same way, and the model related information is determined based on the total score of NETSTAT and ARP.

The above-mentioned definition file may be stored in not the information processing unit 10 but a server communicatively connected with the information processing unit 10. The information processing unit 10 transmits a response packet that has received from the electric appliance 50 to the server to request the model related information from the server. In this case, the server determines the model related information upon request. The model related information determination module 12 of the information processing unit 10 acquires the model related information determined by this server and then executes the subsequent process.

The model related information determination module 12 preferably determines the model related information by scoring based on a plurality of request packets as described above. The request packet may simply be a command of ICMP, SNMP, or the like. Accordingly, the model related information determination module 12 may determine the model related information only based on a response packet to such a request packet by transmitting uPnP.

When the model related information is determined, the program selection module 14 of the information processing unit 10 executes the program selection process (Step S25). In the program selection process, the program selection module 14 references the schedule execution program correspondence table shown in FIG. 5. For example, when the model related information is determined as "A-01," the schedule execution program is determined as "PROGRAM A (FILTERING CONFIGURATION)" from the schedule execution program correspondence table.

This "PROGRAM A" is to be executed on "DETECTED DEVICE." Accordingly, the program selection module 14 transmits the program A to the detected electric appliance 50 so that the electric appliance 50 can execute the program A. The second program execution module 52 of the electric appliance 50 executes the received program A (Step S26).

When the program A is previously stored in the electric appliance 50, the information processing unit 10 may transmit a command to start the program A instead of transmitting the program A to the electric appliance 50 so that the electric appliance 50 can execute the program A.

The program to be executed like the program A may be a program to perform a predetermined configuration of the electric appliance 50, such as the filtering configuration of the web page. The program may be a program to install software such as a driver or a module in the electric appliance 50. The program may be a program to install software such as a driver or a module associated with the electric appliance 50 in the information processing unit 10. For example, the program to be installed in the information processing unit 10 may be software for a remote control operating the electric appliance 50.

Figure 9:
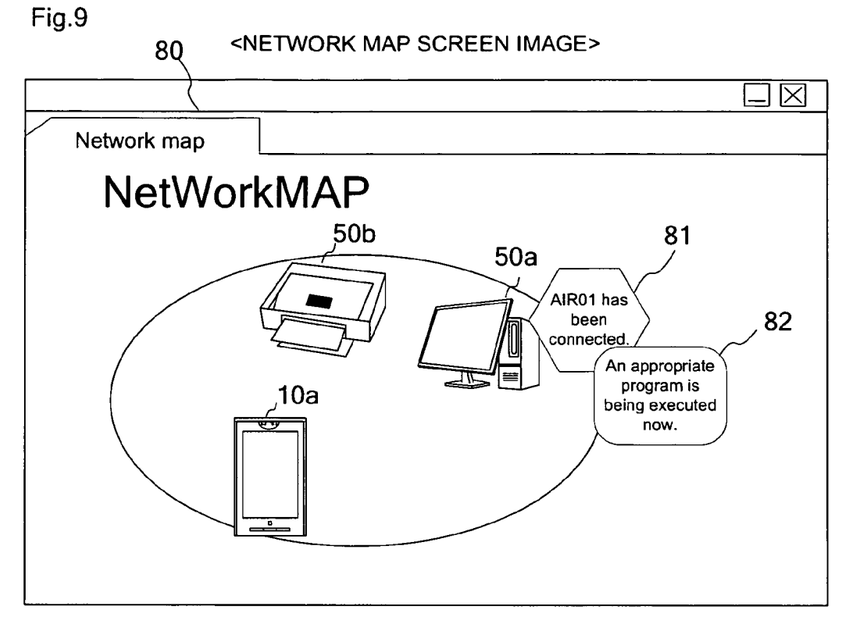
FIG. 9 is an example screen image of the network map displayed on the access terminal.

As shown in FIG. 9, the information processing unit 10 may display the communicatively connected electric appliance 50 in a network map and the program execution status 82, by accessing the information processing unit 10 from the access terminal 30.

For example, when the model related information is determined as "B003," the schedule execution program is determined as "PROGRAM B (PAGE GENERATION)" from the schedule execution program correspondence table. Since this "PROGRAM B" is to be executed in "DETECTION EXECUTION DEVICE," the information processing unit 10 executes the program B. The process of the program B executed on the information processing unit 10 will be described in the steps S27 to S29.

The target device to execute the selected program may be any device communicatively connected with the information processing unit 10 and the electric appliance 50 as long as it is associated in the schedule execution program correspondence table.

The URL generation module 15 of the information processing unit 10 executes the URL generation process provided for the detected electric appliance 50 (Step S27). The URL generation process is a process to generate a URL that is an address for a unique web page to the electric appliance 50. Specifically, the URL generation process is a process to newly generate each directory (path name) for a hostname preliminarily acquired for a URL. For example, the URL address with the hostname "http://www.AAA.JP/" and the model related information "B003" is generated as "http://www.AAA.JP/B003/."

Figure 10:
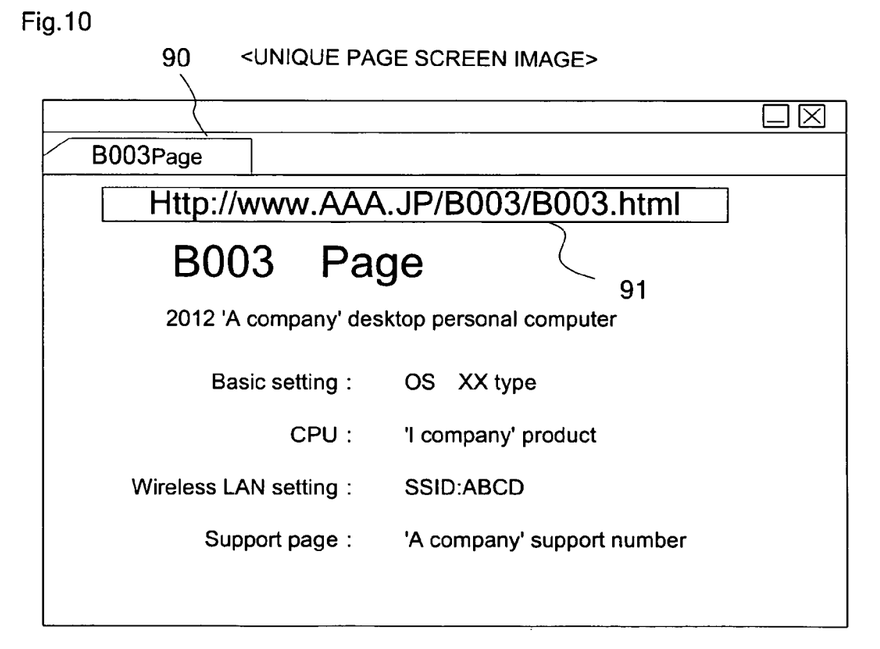
FIG. 10 is an example screen image of the unique page displayed on the access terminal.

The page generation module 16 generates a unique page for this electric appliance 50 (Step S28). The unique page is a web page for the electric appliance 50 associated with the generated URL address, in which the model related information of and other information of the electric appliance 50 are described. FIG. 10 shows a screen image of the unique page displayed on the access terminal 30. The information processing unit 10 may acquire information on the detected electric appliance 50 to be described in the unique page from other devices based on the model related information of the electric appliance 50.

In the method of generating the unique page, information on the detected electric appliance 50 is added to patterned HTML data previously stored in the information processing unit 10 to generate the unique page. The generated unique page is stored as a file in the directory falling under "http://www.AAA.JP/B003/". The file name is determined as "B003.html" based on the model related information of the electric appliance 50. In this case, the resulting URL address is "http://www.AAA.JP/B003/B003.html/." The information processing unit 10 functions as a web server allowing access from the access terminal 30 to the unique page.

Specifically, the page generation module 16 of the information processing unit 10 receives viewing and operation of the unique page from the access terminal 30 while the unique page is accessible (Step S29). The access terminal 30 can access the unique page by executing the page viewing and operation module 31 functioning as a web browser. As shown in FIG. 10, the web browser of the access terminal 30 displays the page "B003" 90 corresponding to the detected electric appliance 50. For this display, the URL address 91 generated in the above-mentioned process is specified.

Therefore, the unique page is automatically generated after the model related information so that the setting operation and the setting information viewing of the electric appliance 50 can be easily performed.

Program Selection Process

Figure 4:
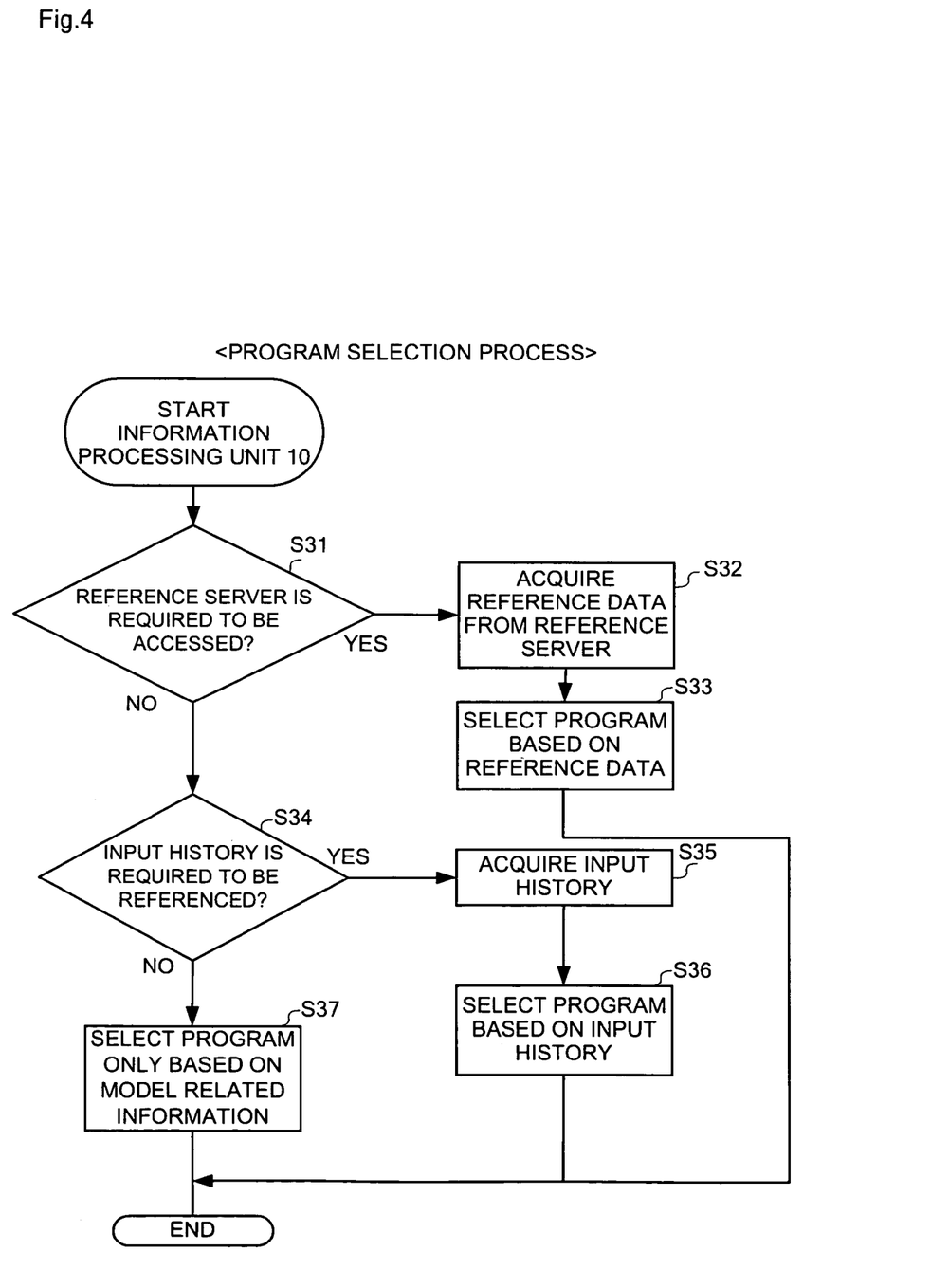
FIG. 4 shows a flow chart illustrating an example program selection process executed by the information processing unit.

Another example program selection process will be explained in reference to the flow chart of FIG. 4.

The program selection module 14 of the information processing unit 10 determines whether or not the reference server 300 is required to be accessed (Step S31). If the reference server 300 is required to be accessed (Step S31: "YES"), the process is moved to the step S32. If not (Step S31: "NO"), the process is moved to the step S34.

The program selection module 14 determines the model related information and then references the schedule execution program correspondence table as described above. For example, in the case of the model related information "PS-01," the schedule execution program is "ACCESS TO REFERENCE SERVER" associated with the URL address of the reference server "http://www.XXXXX." If the model related information corresponds to "ACCESS TO REFERENCE SERVER" in the schedule execution program correspondence table, the step S31 returns "YES," and then the reference server 300 is accessed based on the associated URL address. If not, the step S31 returns "NO," and then the process is moved to the step S34.

The program selection module 14 acquires reference data from the reference server 300 (Step S32) and then selects an execution program based on the reference data (Step S33). For example, the reference data may be data on the software modification page of the electric appliance 50. FIG. 6 is an example of the web page with reference data. For example, as shown in FIG. 6, the program selection module 14 accesses the software modification page 60 of the electric appliance 50 with the device related information "PS-01" based on the URL address, references this page, and then checks the latest file name of the update module (e.g., "fix012"). In this case, the reference data is the file name "fix012" of this update module.

Figure 7:
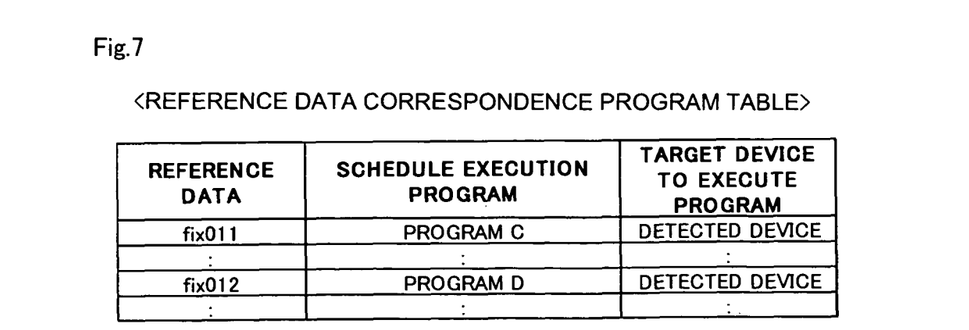
FIG. 7 shows an example reference data correspondence program table stored in the information processing unit.

The program selection module 14 references the reference data correspondence program table based on the file name of the update module acquired from the reference server 300 to select a predetermined program. For example, in the case of the reference data "fix011," PROGRAM C is executed. In the case "fix012," PROGRAM D is executed.

Assume that the update modules of "fix011" and older versions are previously installed in the information processing unit 10. In this case, when the checked latest file name is "fix012," the module "fix012" is acquired from the reference server 300 or the like by PROGRAM D and then set in the information processing unit 10. When the checked latest file name is not "fix012" but "fix011" unlike FIG. 6, PROGRAM D to set "fix012" does not required to be executed. Instead of PROGRAM D, PROGRAM C is executed but not to set the update module.

The program selection module 14 of the information processing unit 10 determines whether or not input history is required to be referenced (Step S34). If input history is required to be referenced (Step S34: "YES"), the process is moved to the step S35. If not (Step S34: "NO"), the process is moved to the step S37. In the step S37, the program selection module 14 of the information processing unit 10 references the schedule execution program correspondence table and then selects program only based on the model related information, as described above.

For example, the program selection module 14 determines the model related information and then references the schedule execution program correspondence table, as described above. For example, in the case of the model related information "DE004," the schedule execution program is "REFERENCE INPUT HISTORY OF WINDOW A." The window A is one window being displayed on the electric appliance 50 with the model related information determined as "DE004."

Figure 8:
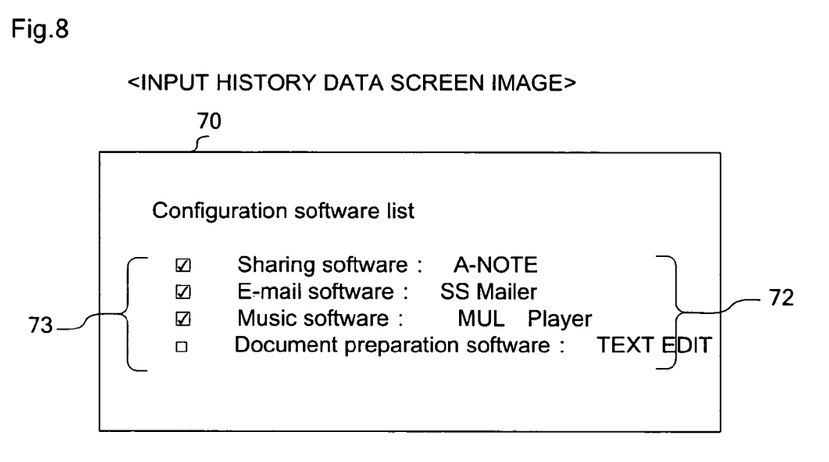
FIG. 8 is an example screen image of the input history data screen displayed on the electric appliance.

FIG. 8 shows the screen image 70 where the window A is a window for setting operation of the configuration software list. For example, the electric appliance 50 is a personal computer. A user checks the checkboxes to set desired software from the configuration software list being displayed on the electric appliance 50. In FIG. 8, the checkboxes of sharing software, e-mail software, and music software are checked.

The program selection module 14 acquires the input history for the electric appliance 50 (Step S35), and then selects a program based on the input history (Step S36). Specifically, the program selection module 14 downloads the checked sharing software, e-mail software, and music software and then starts an install program.

The input history may include not only checking the checkboxes as described above but also inputting text messages. The input history may also include selecting by pull-down menus, radio buttons, or the like.

An appropriate program is selected and executed automatically based on the result of accessing the reference server 300 and the input history for the electric appliance 50 so that the user convenience can be enhanced.

To achieve the functionality as described above, a computer (including a CPU, an information processing unit, or various terminals) reads and executes a predetermined program. For example, a program is provided recorded on a computer-readable storage medium such as a floppy disk, a CD (e.g., CD-ROM), or a DVD (e.g., DVD-ROM or DVD-RAM), or the like. In this case, a computer reads a program from the storage medium, forwards the program to an internal or external memory device to store the program in such a memory device, and executes the program. For example, the program may be previously recorded in a memory device (storage medium) such as a magnetic disk, an optical disk, or a magnetic optical disk, and then provided from the memory device to a computer through a communication line.

The embodiments of the present invention are described above, but the present invention is not limited thereto. The effects described in the embodiments of the present invention are merely listed as the most suitable effects produced from the present invention. The effects of the present invention are not limited to those described in the embodiments of the present invention.

REFERENCE SIGNS LIST

1 program execution system
3 public network
10 information processing unit
30 access terminal
50 electric appliance

I claim:

1. An apparatus comprising memory and a processor configured to execute a predetermined process in response to connecting an electric appliance with a network, the predetermined process including:
a detection module configured to detect the electric appliance connected with the network;
a model related information determination module configured to determine model related information of the detected electric appliance; and
a program execution module configured to select a program based on the determined model related information and to execute the selected program in a device communicatively connected with the electric appliance;
wherein:
the model related information determination module is configured to determine the model related information of the detected electric appliance by:
transmitting a plurality of request packets to the detected electric appliance over the network;
receiving a plurality of response packets from the detected electric appliance over the network in response to the plurality of request packets; and
scoring each response packet of the plurality of response packets with respect to a plurality of model types, scoring information for each model type being stored in a definition file for that model type; and
the program execution module is configured to select the program by:
referencing a program execution table using the model related information as an index;
if a program execution value indexed by the model related information indicates a web address, then selecting the program based on reference data provided by a web server located at the web address;
otherwise, if the program execution value indexed by the model related information references a display window, then selecting the program based on an input history of the display window; and
otherwise, selecting a program indexed by the model related information to be executed on a target device indexed by the model related information.

2. The apparatus according to claim 1, wherein the program execution module executes a program to generate one URL address corresponding to the electric appliance and a page corresponding to the URL address, the page describing the electric appliance, and to allow the page to be viewed from other devices.

3. The apparatus according to claim 1, wherein the program execution module selects a corresponding program based on the model related information as well as input history for the electric appliance or web page information referenced from the electric appliance.

4. An apparatus comprising memory and a processor configured to execute a predetermined process in response to connecting an electric appliance with a network, the predetermined process including:
a detection module configured to detect the electric appliance connected with the network;
a model related information determination module configured to determine model related information of the detected electric appliance by communicating with a server; and
a program execution module configured to select a program based on the determined model related information and to execute the selected program in a device communicatively connected with the electric appliance;
wherein:
the model related information determination module is configured to determine the model related information of the detected electric appliance by:
transmitting a plurality of request packets to the detected electric appliance over the network;
receiving a plurality of response packets from the detected electric appliance over the network in response to the plurality of request packets;
sending the plurality of response packets to the server over a network connection, each of the plurality of response packets to be scored by the server with respect to a plurality of model types, scoring information for each model type being stored on the server in a definition file for that model type; and receiving the model related information from the server over the network in response to sending the plurality of response packets to the server; and the program execution module is configured to select the program by:

referencing a program execution table using the model related information as an index;

if a program execution value indexed by the model related information indicates a web address, then selecting the program based on reference data provided by a web server located at the web address;

otherwise, if the program execution value indexed by the model related information references a display window, then selecting the program based on an input history of the display window; and otherwise, selecting a program indexed by the model related information to be executed on a target device indexed by the model related information.

5. A method in response to connecting an electric appliance with a network, the method comprising the steps of:

detecting the electric appliance connected with the network;

determining model related information of the detected electric appliance; and selecting a program based on the determined model related information and executing the selected program in a device comprising a memory and a processor communicatively connected with the electric appliance;

wherein:

determining the model related information of the detected electric appliance includes:

transmitting a plurality of request packets to the detected electric appliance over the network;

receiving a plurality of response packets from the detected electric appliance over the network in response to the plurality of request packets; and scoring each response packet of the plurality of response packets with respect to a plurality of model types, scoring information for each model type being stored in a definition file for that model type; and selecting the program includes:

referencing a program execution table using the model related information as an index;

if a program execution value indexed by the model related information indicates a web address, then selecting the program based on reference data provided by a web server located at the web address;

otherwise, if the program execution value indexed by the model related information references a display window, then selecting the program based on an input history of the display window; and otherwise, selecting a program indexed by the model related information to be executed on a target device indexed by the model related information.

6. A computer program product for use in an information processing unit executing a predetermined process in response to connecting an electric appliance with a network, comprising a non-transitory computer usable medium having a set of instructions physically embodied therein, the set of instructions including computer readable code, which when executed by the information processing unit causes the information processing unit to:

detect the electric appliance connected with the network;

determine model related information of the detected electric appliance; and select a program based on the determined model related information and to execute the selected program in a device communicatively connected with the electric appliance;

wherein:

determining the model related information of the detected electric appliance includes:

transmitting a plurality of request packets to the detected electric appliance over the network;

receiving a plurality of response packets from the detected electric appliance over the network in response to the plurality of request packets; and scoring each response packet of the plurality of response packets with respect to a plurality of model types, scoring information for each model type being stored in a definition file for that model type; and selecting the program includes:

referencing a program execution table using the model related information as an index;

if a program execution value indexed by the model related information indicates a web address, then selecting the program based on reference data provided by a web server located at the web address;

otherwise, if the program execution value indexed by the model related information references a display window, then selecting the program based on an input history of the display window; and otherwise, selecting a program indexed by the model related information to be executed on a target device indexed by the model related information.

* * * * *